(No Model.)

H. DAVIES.
MASH PREPARING APPARATUS.

No. 245,998. Patented Aug. 23, 1881.

WITNESSES

INVENTOR
Henry Davies.
By Liggett & Liggett
ATTORNEYS (No Model.) 7 Sheets—Sheet 2.
H. DAVIES.
MASH PREPARING APPARATUS.
No. 245,998. Patented Aug. 23, 1881.

WITNESSES
INVENTOR
Henry Davies.
By Leggett & Leggett
ATTORNEYS

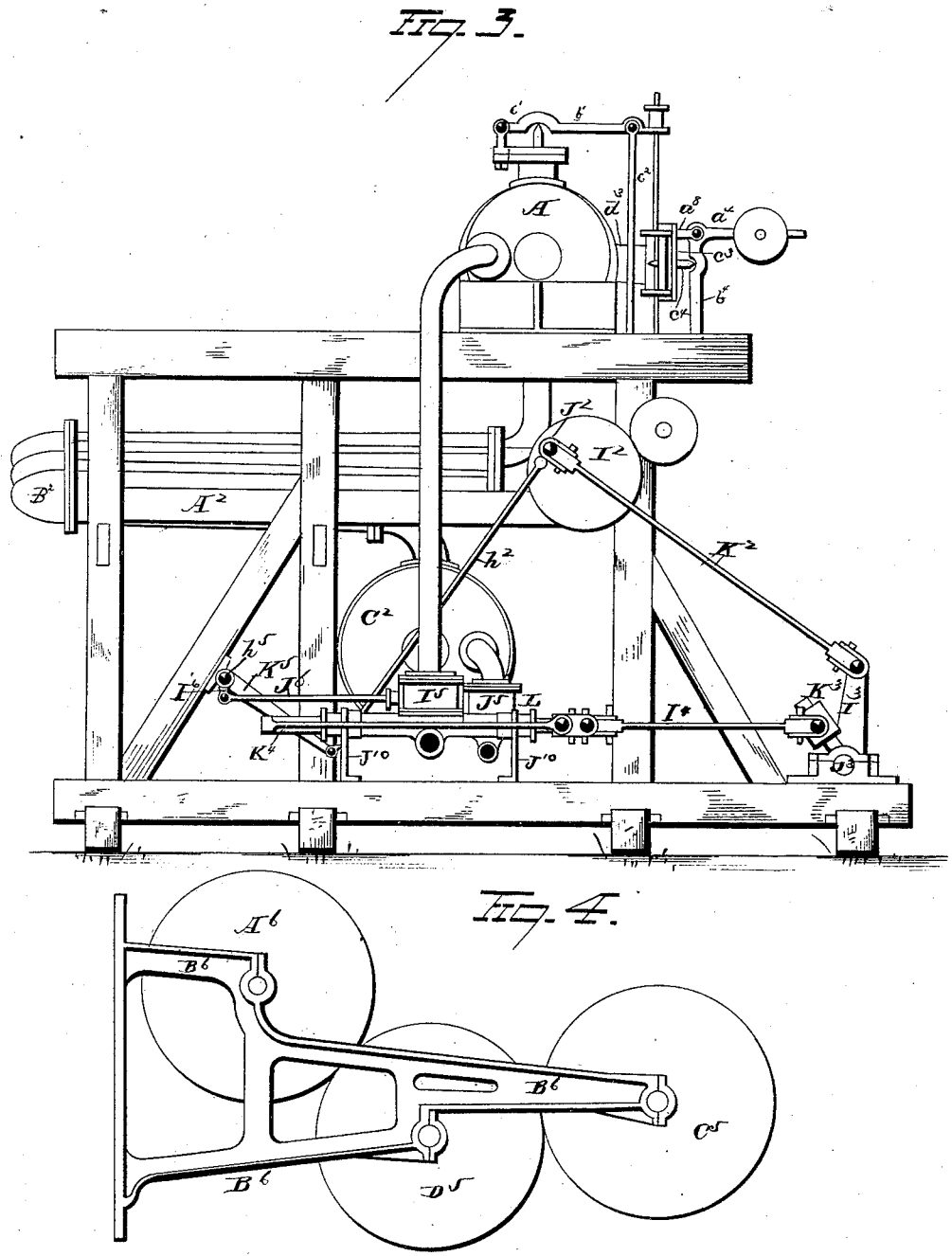

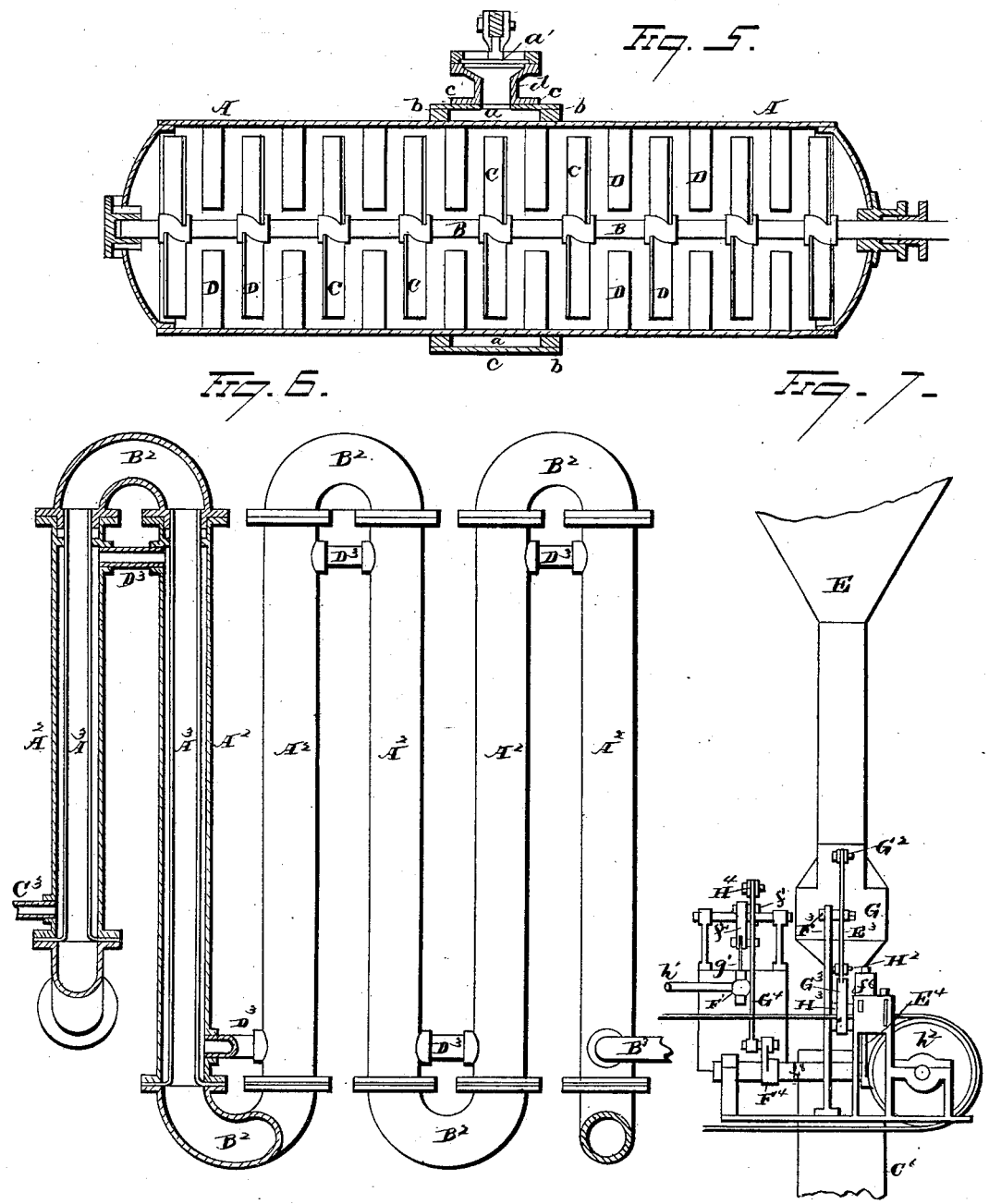

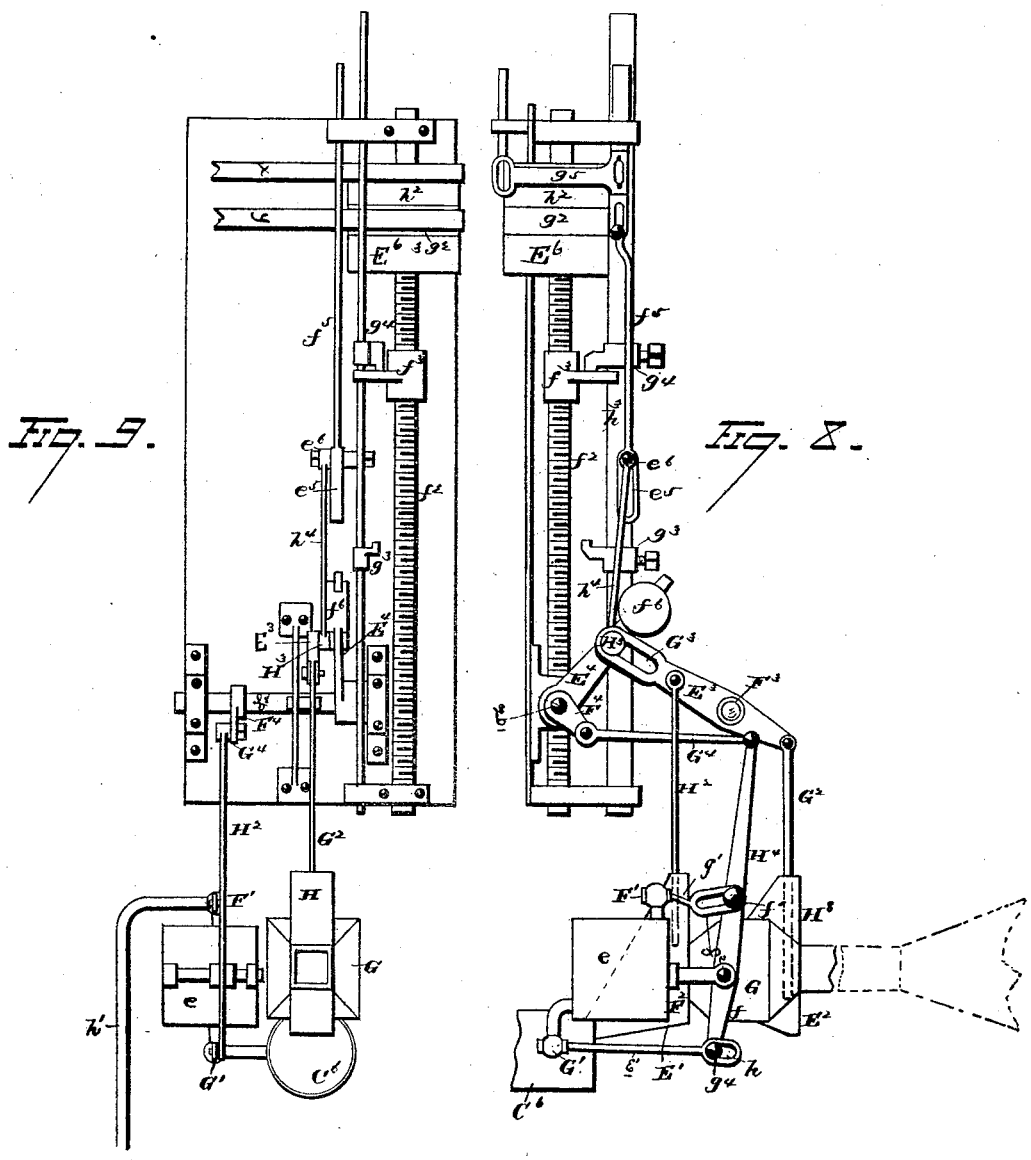

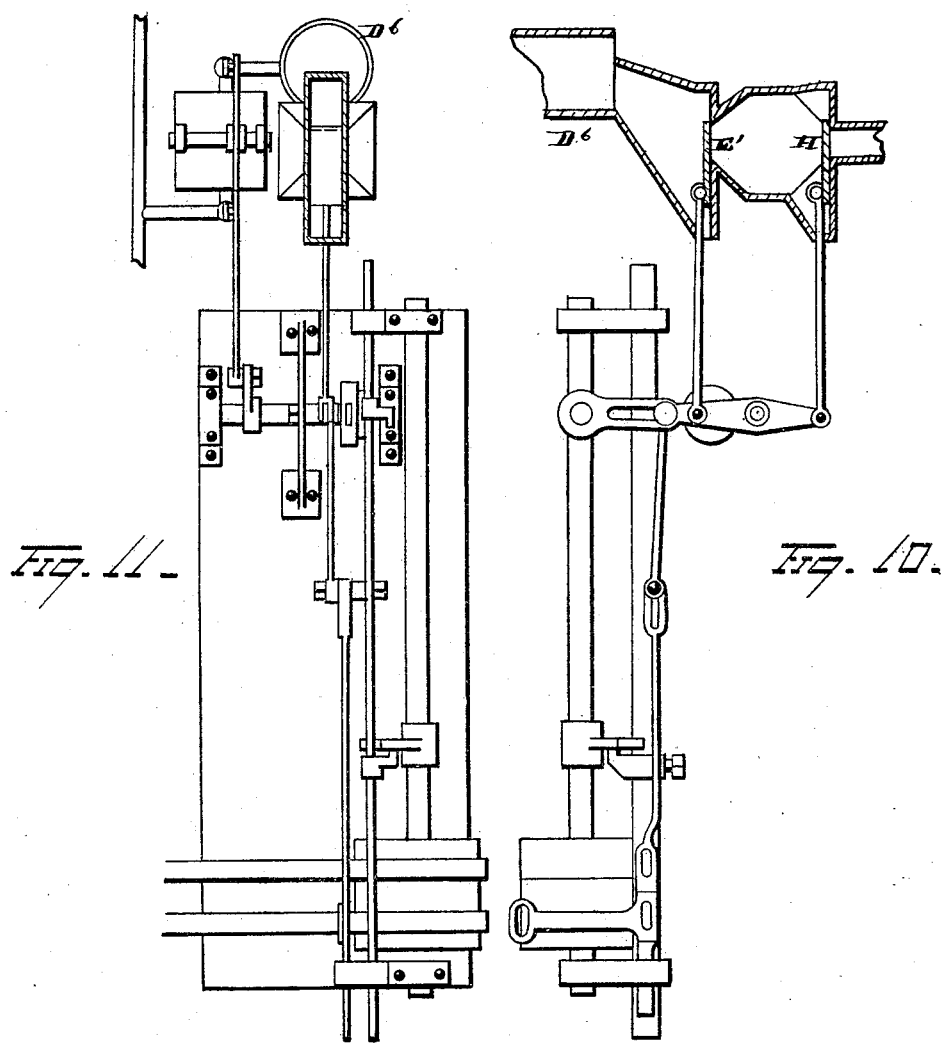

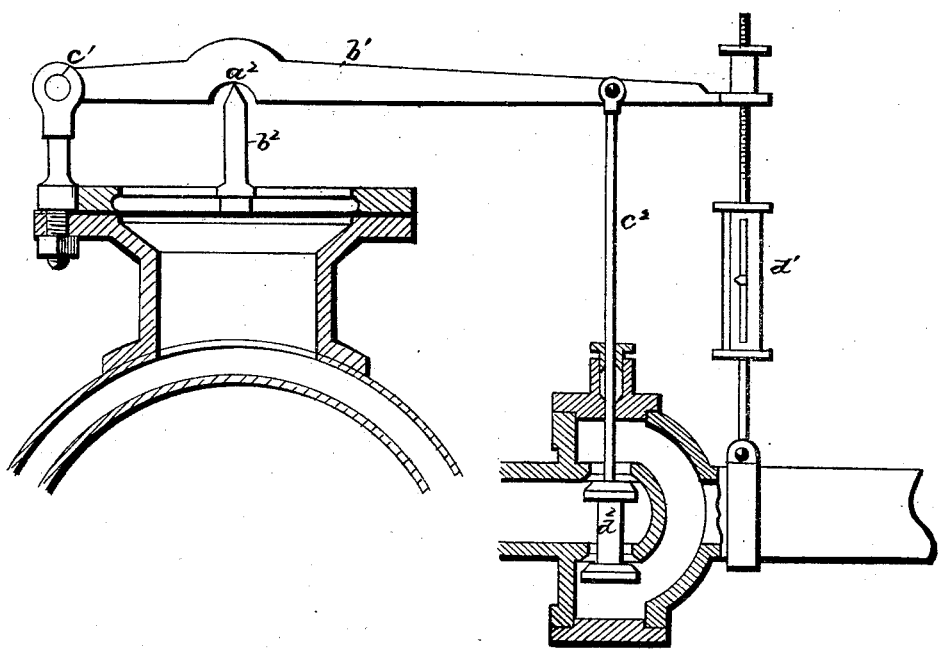

UNITED STATES PATENT OFFICE.

HENRY DAVIES, OF NEWPORT, KENTUCKY.

MASH-PREPARING APPARATUS.

SPECIFICATION forming part of Letters Patent No. 245,998, dated August 23, 1881.

Application filed December 29, 1880. (No model.)

*To all whom it may concern:*

Be it known that I, HENRY DAVIES, of Newport, in the county of Campbell and State of Kentucky, have invented certain new and useful Improvements in Mash-Preparing Apparatus; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to apparatus for the production of alcoholic liquors, the object being to provide new and improved means whereby various grains are prepared for distillation.

In the production of spirituous or alcoholic liquors from the different cereals most commonly employed for that purpose, and which furnish the basis of the alcoholic element in the liquor, there are two distinct and yet inseparable processes, which, stated in the order of their occurrence, are, first, the sacchariation of the amylaceous element in the cereal employed, and, second, the fermentation or chemical decomposition of the substance obtained by the first process to produce alcohol, which will exist in the product of the first distillation in a combined state, from which it may be obtained in a pure condition by a series of eliminations and redistillations.

My invention relates to and provides apparatus for the accomplishment of the first of these two processes—namely, the sacchariation of the amylaceous element in the different cereals, a chemical change represented by the formula $C^6H^{10}O^5 + H^2O = C^6H^{12}O^6$ being brought about by subjecting the grain in a powdered condition and in combination with a certain quantity of malt to a series of different pressures, temperatures, and to a system of violent agitation.

With this end in view, my invention consists in an apparatus of which the details of construction and combinations of parts will be hereinbelow described, and pointed out in the claims.

Figure 1:
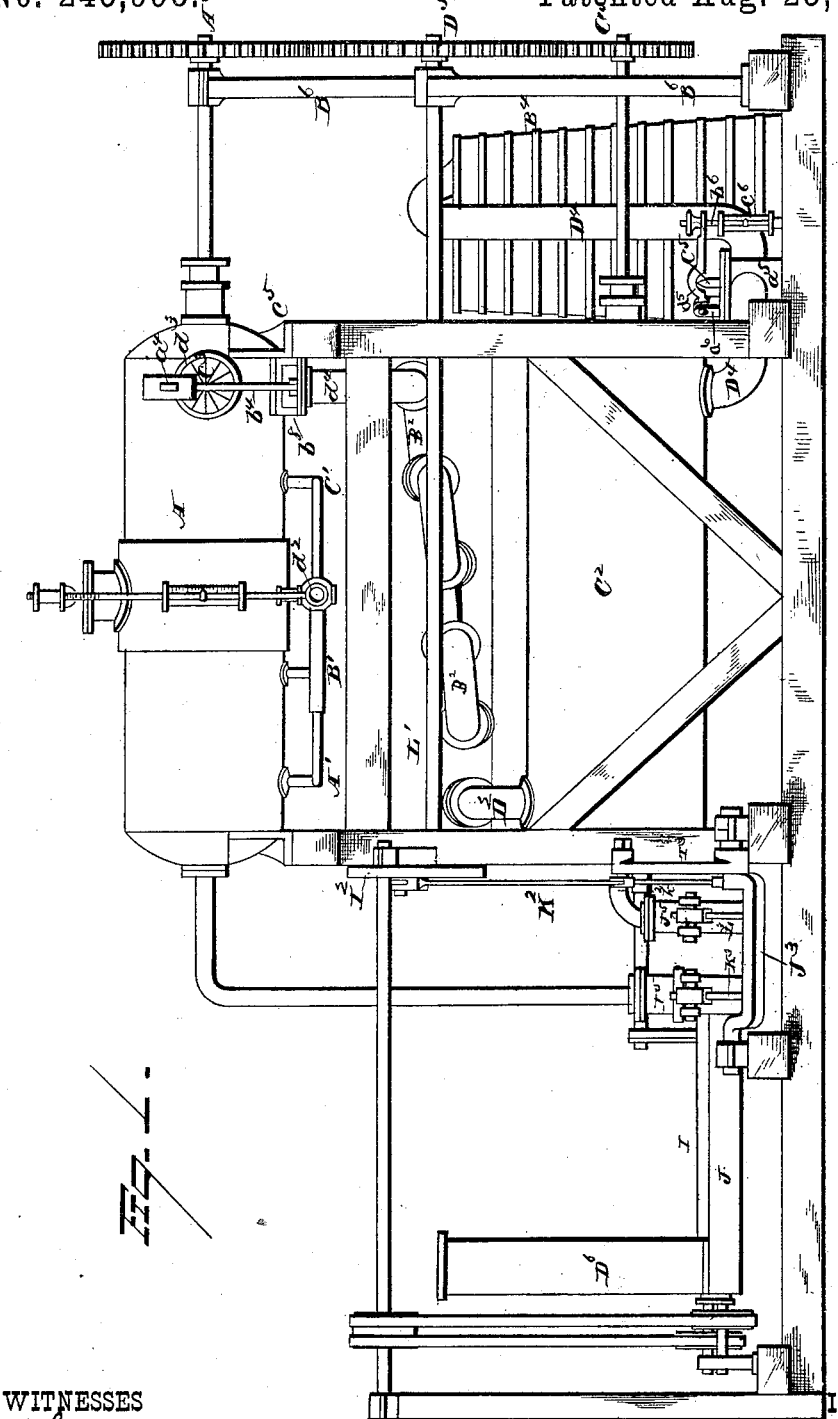
Figure 2:
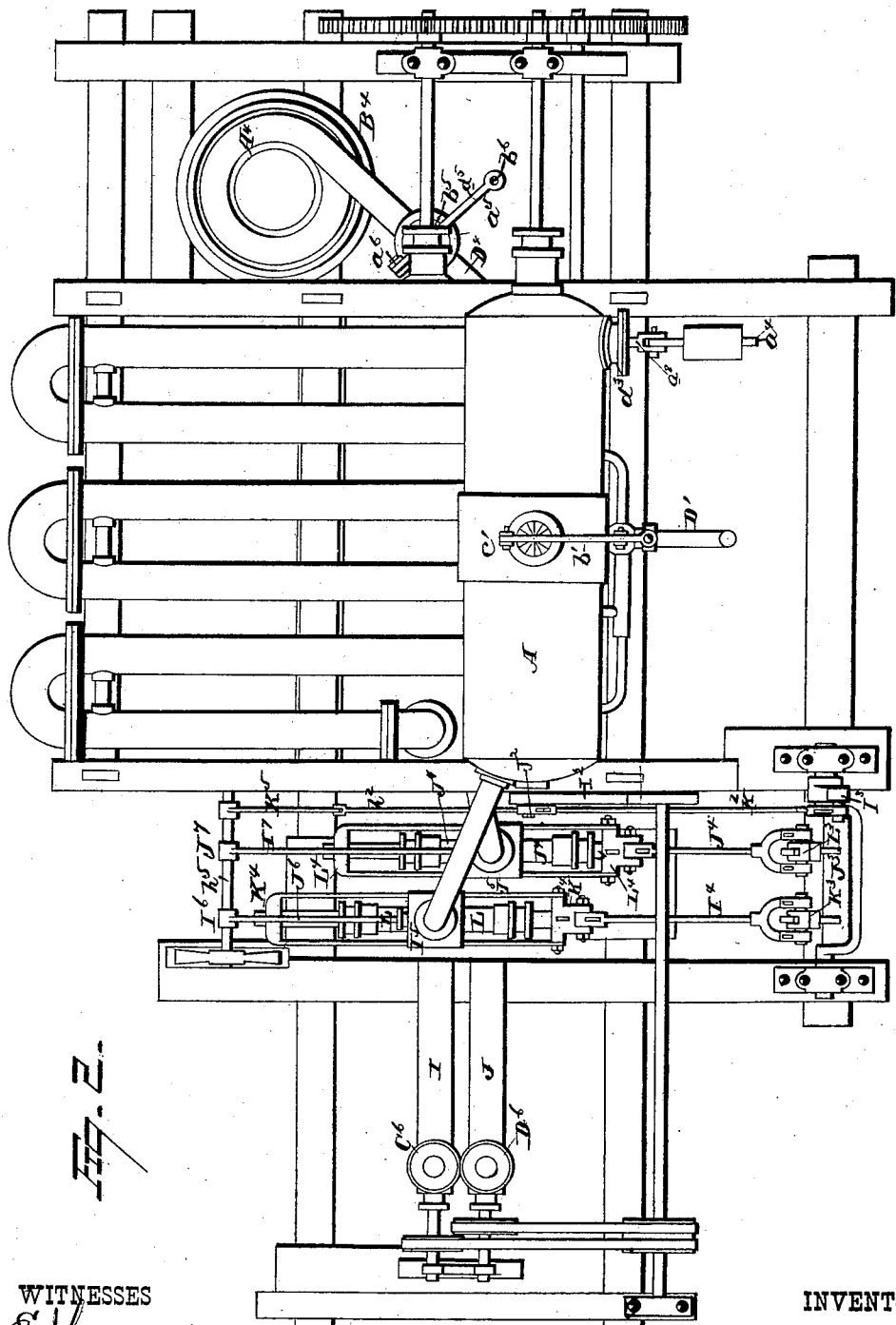

In the accompanying drawings, Figure 1 is a view, in side elevation, of my apparatus, with the feeding devices removed. Fig. 2 is a plan view of Fig. 1. Fig. 3 is an end view thereof. Fig. 4 is a bearing frame or stand for the shafting and pulleys which operate the stirrers in the different cylinders, hereinafter to be described. Fig. 5 is a view, in vertical section, of the scalding-cylinder, shown in Figs. 1, 2, and 3. Fig. 6 is a plan view of the cooling-pipes, a portion thereof being shown in section to exhibit their internal construction and arrangement. Fig. 7 is an end elevation of the feeding apparatus. Fig. 8 is a view, in side elevation, of that part of the feeding apparatus which controls the admission of water and grain into the upright vessel $C^6$. Fig. 9 is a plan view thereof. Fig. 10 is a view, part in section and part in elevation, of the feeding apparatus which controls the admission of water, malt, and small grain into the upright vessel $D^6$. Fig. 11 is a plan view thereof, and Fig. 12 is an enlarged view of the annular chamber and valve mechanism of cylinder A.

Let A represent a scalding-cylinder or heating-vessel suitably mounted on frame-work, and interiorly provided with a stirrer or agitator, B, the radial arms C of which revolve in parallel planes and between arms D, attached to the inner circumference of the cylinder and inwardly projecting thereinto. An annular steam-tight chamber, $a$, is formed around the outer face of the cylinder A by two rings, $b$, and a broad metallic band, $c$, resting thereon. An upright standard, $d$, located at the upper portion of the annular chamber and having open communication threwith, is provided at its upper extremity with a reciprocating diaphragm, $a'$, having radial plates on its upper face. In its normal condition this diaphragm is held down by a lever, $b'$, fulcrumed to the vertical standard at $c'$, and having a spring tension-weight inclosed in casing $d'$, the point of application of the power being between the weight and the fulcrum at a point, $a^2$, where a pin, $b^2$, secured to the diaphragm $a'$, engages with the under face of the lever $b'$. A rod, $c^2$, attached to the lever at a point between the power and the weight, is adapted, by means of valve mechanism at $d^2$, to control the passage of steam into the cylinder A through pipes A' B' C' D' by cutting off the entrance of the steam thereinto at $d^2$.

When steam has been admitted to the cylinder and the temperature thereof raised to about 300° Fahrenheit, the water in the annular chamber will be converted into steam, which will operate, when it has obtained a sufficiently high tension, to overcome the weight represented by the spring and raise the outer end of the lever, and, together with it, the rod $c^2$, which will in turn close the valve at $d^2$, and prevent the further entrance of steam into the cylinder A. The valve at $d^2$ will remain closed until the tensional power of the steam inclosed in the annular chamber is so lowered that it no longer has force enough to hold the lever-arm in its raised position, which will fall and again open the valve at $d^2$, allowing the readmission of steam into the cylinder A. After the annular chamber has been filled to a desired height with water it is hermetically sealed, inasmuch as the simple resolution of water to steam, and the condensation of the latter to water following a lowered temperature, involves no waste; yet, it is well to provide some means whereby water may be introduced into the chamber, as a portion of the water therein contained may become dissipated by leakage and other causes.

At the side of the cylinder, and having internal connection therewith, a valve is placed, said valve operating to open and close connection between the interior of the cylinder A and the system of cooling-tubes to be hereinafter described. Like the annular steam-chamber valve located on top of the cylinder A, this valve consists in a diaphragm, $c^3$, reciprocating in a circular standard, $d^3$, and is governed by a two-armed lever pivotally secured to a post, $a^3$, attached to and projecting from the upper portion of the outer edge of the said standard $d^3$. The outwardly-projecting arm $a^4$ of said lever is graduated and provided with a movable weight, by the manipulation of which the pressure required to move the downwardly-projecting arm $b^4$ of the lever is regulated. The lower end of the said arm $b^4$, against which a pin, $c^4$, attached to the diaphragm $c^3$ impinges, is adapted to operate a sliding valve, $c^5$, having movement in valve-box $b^8$, located in the connection $d^4$ between the cylinder A and the system of cooling-tubes $A^2$, connected by curved elbows $B^2$. When the pressure of the heated meal and water in the cylinder A, into which it is constantly pumped, has attained a sufficient number of pounds to the square inch to force the diaphragm out, and thus open the sliding valve $c^5$, the meal and water will pass into the system of cooling-tubes through the connection $d^4$, and, flowing through them, will be cooled before reaching the mixing-cylinder $C^2$. The cooling-tubes $A^2$ are horizontally supported on suitable frame-work, and are located in a plane downwardly inclined from the rear end of cylinder A to the front end of cylinder $C^2$, with which they have connection through tube $D^2$ In the accompanying drawings, Fig. 6 is a view, partly in plan and partly in vertical section, of the cooling-system. It will be seen that the pipes or tubes $A^2$ are only casings for smaller pipes, $A^3$, through which the scalded meal and water pass, the inner space between the two tubes being filled with constantly-changing water admitted through pipe $B^3$ and discharged by pipe $C^3$, water communication being had between the outer pipes, $A^2$, through cross pipes or tubes $D^3$, which connect them. The meal and water issues from the scalding-cylinder A in a highly-heated condition, and before it is allowed to commingle with the small grain, malt, and water in the cylinder $C^2$ its temperature must be lowered to at least 212° Fahrenheit, for if mingled with the malt at a higher temperature the life or virtue of the diastase present in the malt would be destroyed and the value of the mash impaired. However, after passing through the pipes $A^2$, which are constantly surrounded by changing cold water, the scalded meal and grain will be reduced to such a temperature that it may be safely introduced into the mixing-chamber $C^2$, from which it is forced into and through the worm $A^4$ contained in the vessel $B^4$. The mixing-chamber $C^2$, located under the cooling-system, is of larger size than the scalding-cylinder, for its function is to mix the scalded meal and water after it has been discharged thereinto with malt, small grain, and water pumped directly into it by a suitably-arranged pump, to be hereinafter described. A pipe, $D^4$, connecting the cylinder with the worm $A^4$, is attached to the bottom of the rear portion of cylinder $C^2$.

Near the point of connection between the cylinder $C^2$ and the tube or pipe $D^4$ a valve-box, $a^5$, is located, which latter is provided with a reciprocating diaphragm, $b^5$, Fig. 2, having a pin, $c^5$, attached to its upper face, said pin impinging against the under surface of a lever, $d^5$, the short arm of which is pivoted to an upright standard, $a^6$. To the outer end of the long arm of the lever a rod, $b^6$, is attached, which is provided, as a weight equivalent, with a tension-spring inclosed in a casing, $c^6$, said spring being so adjusted that it will hold the valve in its normal closed position until the cylinder $C^2$ is completely filled with the mash, when the continuing action of the pumps will increase the pressure sufficiently to raise diaphragm $b^5$ and allow the combined mash in the cylinder to pass into the worm $A^4$ through conduit or tube $D^4$. Cylinder $C^2$ is further provided with an agitator or mixer having radial arms attached thereto. The said stirrer is actuated in rotation through pulley $C^5$, which, together with cog-wheels $D^5$ and $A^6$, is mounted on bearing-frame $B^6$. The pulleys $C^5$ and $A^6$ have peripheral engagement with and are revolved by the central cog-wheel, $D^5$, actuated by communication with any approved and convenient power.

Having thus described the scalding or heating cylinder, the cooling apparatus, and the mixing-chamber, I will now proceed to describe the construction and operation of the automatic feeding apparatus, whereby two streams—one of meal and water and one of small grain, malt, and water—are fed, respectively, into the heating-cylinder and the mixing-chamber at regular and predetermined intervals.

As has been previously stated, two independent streams of fluid matter are introduced into the apparatus simultaneously. There must be, therefore, independent feeding devices—one to feed water and meal into the vertical vessel $C^6$, and one to admit small grain, malt, and water into the standing vessel $D^6$. Such devices are shown in Figs. 7, 8, 9, 10, and 11 of the drawings. Figs. 9 and 11 are plan views of the feeding apparatus, which is mounted on a suitable fabric of frame-work, and in a plane at right angles to a plane passing longitudinally through the mixing-chamber A.

The position of the feeding apparatus on the combined device may be readily understood by reference to Figs. 2, 9, and 10 of the drawings, said views being plan views. It follows that when parts lettered $C^6$ $D^6$ of Figs. 9 and 10 are made to register with similarly-lettered parts of Fig. 2 the correct relative position of the parts is the consequence.

E represents the upright funnel-shaped receivers of the vessel $C^6$. Said funnel E terminates in a valve-box, G, in which valves H and $E'$ are automatically operated to control the supply of grain into the valve-box G from the funnel-receiver and into the upright receptacle $C^6$ from the valve-box G. Another set of valves, $F'$ $G'$, operated, primarily, by the same valve mechanism operating the valves H and $E'$, are arranged to admit water into the water-vessel $e$ through water-valve $F'$, and discharging it into the receiver $C^6$ through valve $G'$. The upper face of the valve-box G is built up at $H^8$ $E^2$ to form a support and protection for the slide-valve H in its open and closed position. A supporting and protecting structure, $F^2$, is also provided at the lower end of the valve-box to answer the ends indicated for the valve $E'$. Horizontal valve-rods $G^2$ $H^2$, respectively controlling valves H and $E'$, have their inner ends attached to said valves and their outer ends secured to a link-lever, $E^3$, pivoted to any suitable support, as at $F^3$. The valve-rod $G^2$ is secured to the upper end of the lever $E^3$, and the rod $H^2$ to the lower end thereof at a point just above the link $G^3$, in which latter a pin, $H^3$, secured midway the length of the pivotal rock-bar $E^4$, has reciprocating movement. A short lever, $F^4$, is rigidly secured to the rock-shaft $b^3$, which is actuated by the oscillating lever $E^4$, secured to it to operate the water-inlet and discharge-valves $F'$ $G'$ through the mediumship of a rod, $G^4$, the lower end of which is pivotally attached to the upper end of the lever $F^4$, the upper end being secured to the inner arm of a horizontal lever, $H^4$, pivotally mounted on a water-receiving vessel, $e$. The outer extremity, $f$, of lever $H^4$ is provided with a pin, $g^4$, which plays within the link $h$ of a link valve-rod, $e'$, to the lower end of which a valve, $G'$, governing the the discharge of water from vessel $e$ into the upright receptacle $C^6$, is attached. Another pin, $f'$, located on the lever $H^4$ at a point between the fulcrum and the power, plays within the link of a link valve-rod, $g'$, to the lower end of which is a valve, $F'$, governing the admission of water from the supply-pipe $h'$ into the water-vessel $e$.

It will be observed that the link of the valve-rod $g'$ is made longer than the link of valve-rod $e'$. This is done in order that either of the valves $F'$ and $G'$ may be opened independently of the other, for it will be seen that if the inner end of the lever $H^4$ is depressed sufficiently to raise and open the valve $G'$ it will still have to be farther depressed before the pin $f'$ will travel to the lower extremity of the link of the rod $e'$ and shut the valve $F'$, supposing it to be open; or again, the inner end of the lever $H^4$ may be elevated sufficiently to close the valve $G'$ without opening the valve $F'$, supposing it to be normally closed.

Having thus described the detailed constructions of the valves H, $E'$, $F'$, and $G'$ and the means resorted to for their operation, I will now proceed with the description of the devices employed to render the operation of the said valves automatic, and whereby their actions may be adjusted, timed as to the interval between any two movements, and also timed relatively to the action of the other valves of the system.

Let $f^2$ designate a screw-shaft, mounted on suitable frame-work, and provided with a loose pulley, $g^2$, between two fixed pulleys, $h^2$ and $e^3$, operated by belts $x$ and $y$ running in opposite directions. This shaft is further provided with a traveling arm, $f^3$, which engages at two different points of its trip with depending arms $g^3$ $g^4$, adjustably secured to the slide-bar $h^3$, located over the shaft $f^2$. When, now, the traveling arm $f^3$ engages in its forward motion with the depending arm $g^3$ secured to the slide-bar, it will move the said slide-bar forward, and by means of rod $h^4$, pivoted to the rock-bar $E^4$ by the same pin that pivots the link-lever $E^3$ thereto, the said rod $h^4$ having its outer end pivoted to the slide-bar, it will operate to raise the rock-bar, depress the inner end of lever $H^4$, open valve $F'$, open slide-valve H, and close valve $E'$. The valve-box will now be filled with meal from the funnel E, and the water-vessel will be filled with water through valve $F'$ from the water-main.

It will be observed that the same pin, $e^6$, that pivots the outer end of the rod $h^4$ to the slide-bar has movement within the link $e^5$ of a belt-shifting device, constructed in usual manner and consisting of a double link-bar, $f^5$, having a lateral arm, $g^5$, adapted to throw the belt $x$, that operated to run the arm $g^4$, forward onto the loose pulley $g^2$ and start belt $y$ running in an opposite direction onto the pulley $E^6$, and by so doing reverse the motion of the screw-shaft $f^2$. It will happen then that the traveling arm $f^3$, engaging with the depending arm $g^3$, will carry the slide-bar forward until the pin $e^6$, engaging with the extreme inner end of the link $e^5$, will carry the rod $f^5$ forward also, and thus shift the belt $y$ onto the forward pulley $E^6$ to reverse the motion of the screw-shaft, and the arm $f^3$ will return to the inner end of the shaft, where it will engage with the arm $g^4$. The slide-bar will now be thrown to the left, carrying with it the rod $h^4$, the rock-bar will incline to the left, slide-valve $E'$ will be opened and slide-valve H be closed, valve $F'$ will be opened, and valve $G'$ will also remain open, and thus water-receiver $e$ and the valve-box will each be discharged simultaneously of their contents. The movement of rock-bar $E^4$ to the left is steadied and accelerated by a counter-weight, $f^6$, attached to its upper extremity. The different valves are adapted to be opened in any concert desired by changing the position of the depending arms $g^3$ $g^4$ on the slide-bar. As a matter of fact, Figs. 8 and 9 of the drawings illustrate the feeding apparatus for the upright cylinder $C^6$, while the feeding apparatus for the upright vessel $D^6$ is represented in Figs. 10 and 11. However, as these devices are exactly identical in construction, a description of one fully illustrates the construction and operation of the other. I have even shown the feeding apparatus of vessel $D^6$ partly in section, that the construction of the apparatus for $C^6$ might be more readily understood. The upright receivers $C^6$ and $D^6$ are connected, respectively, with cylindrical chambers I and J, which latter are provided with stirrers or mixers, not shown in the drawings, but substantially the same as the stirring or agitating devices of chamber A.

The contents of the horizontal mixing-chamber I are forced into the heating-cylinder A by means of a horizontal pump provided with double plungers L, and the contents of the horizontal mixing-chamber J are forced into the mixing-cylinder $C^2$ by a similar pump provided with double plungers $J^4$. The object in providing these pumps with double plungers is to force the meal and water and mingled malt, grain, and water of the vessels I and J into their respective cylinders, as aforesaid, in a steady and continuous stream, thus aiding in raising at certain intervals the pressure of fluid within the cylinders to open their escape-conduits, as before described. These double-plunger pumps, also furnished with valves, as will be hereinafter described, are operated by power transmitted from cog-wheel $D^5$, through shaft $L'$, to wheel $I^2$, to which crank-bars $K^2$ and $h^2$ are connected by a wrist-pin, $J^2$. Of the two crank-bars, the bar $K^2$ is adapted to actuate the plunger-operators $K^4$ and $L^4$, while the bar $h^2$ is adapted to operate the valve-rods $J^6$ and and $I^7$ of the two pumps. The crank-bar $K^2$ is pivoted to a rock-bar, $I^3$, rigidly secured to a rock-shaft, $J^3$, to which two rock-bars, $K^3$ and $L^3$, are secured. A rod, $I^4$, connects the rock-bar $K^3$ with the plunger-operator $K^4$, and transmits its motion thereto and actuates it, while the plunger-operator $L^4$, connected to the rock-bar $L^3$ by rod $J^4$, is actuated in like manner. The plunger-operators, each supporting two plungers, as aforesaid, are themselves mounted in guides $J^{10}$, as shown in Fig. 3 of the drawings. The crank-bar $h^2$, attached by wrist-pin $J^2$ to wheel $I^2$, is connected to a rock-bar, $K^5$, secured to a rock-shaft, $h^5$, to which are secured two rock-bars, $J^7$ and $I^6$. Rock-bar $I^6$ is connected to a valve-rod, $J^6$, which operates a valve in the valve-box $I^5$ of the pump of the mixing-chamber I, and the rock-bar $J^7$ is connected to a valve-rod, $I^7$, which actuates the valve in the valve-box $J^5$ of the pump of the mixing-chamber J.

Having thus described the construction of my improved apparatus for preparing grain for distillation, I will now proceed to briefly describe its manner of operation.

Let us first suppose that the spring tension-weight controlling the valve located on top of the heating-cylinder is set to a pressure of about forty-five pounds to the square inch on the valve $a'$, and that the annular chamber $a$ is by some suitable means partly filled with water, and then closed atmospherically tight; that the adjustable weight on the arm $b^4$ be set in such position as to place a pressure of about fifty-four pounds per square inch on the diaphragm $c^3$, which latter is directly acted upon by the pressure of the contents of the cylinder A, and that the diaphragm $b^5$, located in the valve-box $a^5$, is held down through the agency of the tension-spring with a force equivalent to sixty pounds per square inch. Of course I do not confine myself to the different pressures hereinabove stated, as they may be changed as necessity may require; but whatever changes may be made it is probable that the weights on the different diaphragms will bear the same relation to each other as those above given. The feeding apparatus may now be started; valves will open, as described, to admit meal and water into the valve-box G and the water-vessel $e$. When, now, both of these receptacles are filled, respectively, with meal and water, other valves will be automatically opened to discharge the meal and water into the upright receptacle $C^6$, from which it will fall from its own gravity into the horizontal chamber I, where these two elements of the mash will be thoroughly mingled by revolving agitators or mixers. The pressure of the ever-inpouring supplies of water and meal will now force the mixture under the influence of the double plunger-pump K, by which it will be forced through a vertical pipe into the cylinder A, where it will be subjected to the heating or cooking action of steam entering the cylinder A through pipes $A'$, $B'$, $C'$, and $D'$, and also subjected to violent agitation by means of the stirrer B. The steam admitted into cylinder A, as above described, will raise the temperature thereof to about 300° Fahrenheit. This temperature will convert the water in the annular chamber $a$ into steam, which will, when it has acquired sufficient tension, overcome the spring-weight of forty-five pounds and raise the diaphragm $a'$, and with it elevate the outer arm of the lever $b'$, also rod $c^2$, and partially close valve mechanism at $d^2$, and reduce the flow of steam to the cylinder. Now, as the cylinder is filled the pressure will be soon raised by the continuous action of the pump K to fifty-four pounds to the square inch, which will be sufficient to overcome the weight on the arm $a^4$ of the lever, which holds the diaphragm $c^3$ pressed in. The consequence will be that the downwardly-projecting arm $b^4$ of the lever will be forced out and carry with it a sliding valve, $c^4$, which governs the flow of the mixture in the cylinder A through the cooling system, the mixture will thus flow through the cooling-tubes, and be reduced by the time it is emptied into the cylinder $C^2$ to a temperature of about 150° Fahrenheit. The feeding apparatus shown in Figs. 10 and 11 of the drawings should now be started, and they will operate to supply malt, small grain, and water to the receptacle $D^6$ and to its horizontal mixing-chamber J precisely in the same manner as the feeding apparatus for the receptacle $C^6$ was operated. The said mixture of malt, small grain, and water will be pumped directly into the cylinder $C^2$ by pump I'. The scalded meal and water will now be thoroughly mingled with the malt, small grain, and water by agitator $A^5$. When, now, the cylinder $C^2$ becomes completely filled, the continuous action of the pumps will raise the pressure to sixty pounds to the square inch and overcome the spring tension-weight of the diaphragm $b^5$, and allow the contents of the cylinder to be forced into and through the worm $A^4$, and still further cooled to prepare them for the fermentation-vats.

I would have it understood that I do not limit myself to the exact construction shown and described, but hold myself at liberty to make such slight changes in construction as will fairly fall within the spirit and scope of my invention.

Having fully described my invention, what I claim as new, and desire to secure by Letters Patent, is—

1. In a mash-preparing apparatus, the combination, with a heating-cylinder and a steam-conduit communicating therewith, of an annular chamber encircling the heating-cylinder, a yielding diaphragm having one face open to the annular chamber, a valve located in the steam-conduit lever, and connecting-rods, substantially as described, for transmitting the motion of the diaphragm to the valve, and devices, substantially as described, for regulating the resistance of the yielding diaphragm, substantially as set forth.

2. In a mash-preparing apparatus, the combination, with a heating-cylinder, of a steam-conduit leading thereinto, an annular chamber encircling the cylinder, a cylindrical standard secured over an opening in the chamber, a diaphragm mounted in said standard, a lever, and an adjustable spring and scale, and a valve-rod secured thereto, and a valve located in the steam-conduit and attached to the valve-rod, substantially as set forth.

3. In a mash-preparing apparatus, the combination, with a heating-cylinder and pumps for forcing mash into said cylinder, of a discharge-conduit and automatic valve mechanism to open and close communication between said cylinder and conduit, substantially as set forth.

4. In a mash-preparing apparatus, the combination, with a cylinder and steam-conduits leading thereinto, of two rings encircling the cylinder, a band encircling and resting on said rings to form an annular chamber, an upright standard communicating with the chamber, a diaphragm, a lever actuated thereby, a spring-weight, and a depending rod attached to the lever, and a valve attached to the rod and by it adapted to regulate the passage of steam into the cylinder through the conduits, substantially as set forth.

5. In a mash-preparing apparatus, the combination, with a heating-cylinder, pumps for forcing mash thereinto, and a conduit for discharging it therefrom, of a diaphragm located in the cylinder, a two-armed lever operated by the diaphragm, a weight secured to the upper arm of the lever, a valve located in the discharge-conduit, and a rod connecting the lower arm of the lever and valve, substantially as set forth.

6. In a mash-preparing apparatus, the combination, with a heating-cylinder and a system of cooling-pipes communicating therewith, of automatic valve mechanism for automatically opening and closing communication between said heating-cylinder and cooling-pipes, substantially as set forth.

7. In a mash-preparing apparatus, the combination, with a heating and a mixing cylinder, of a conduit connecting them and automatic valve mechanism operated by a diaphragm located in the heating-cylinder to open and close communication between it and the mixing-cylinder, substantially as set forth.

8. In a mash-preparing apparatus, the combination, with a heating-cylinder, pumps for forcing mash thereinto, and a diaphragm located in it, of a mixing-cylinder, a conduit connecting it with the heating-cylinder, a valve located in said conduit, and a system of levers connecting the diaphragm and valve, substantially as set forth.

9. In a mash-preparing apparatus, the combination, with a heating cylinder and a system of cooling-pipes, of a mixing-cylinder into which the cooling-pipes discharge the mash, conduits to discharge into the mixing-cylinder a mixture of malt, grain, and water, and an agitator located in said cylinder to mingle its contents, substantially as set forth.

10. In a mash-preparing apparatus, the combination, with a mixing-cylinder, of pumps to force mixed malt, grain, and water thereinto, of a worm, and automatic valve mechanism to open and close communication between the worm and cylinder.

11. In a mash-preparing apparatus, the combination, with a mixing-cylinder, of pumps to force mixed malt, grain, and water thereinto, a discharge-conduit, a valve located therein, a diaphragm, a lever, an adjustable weight attached thereto, and a rod connecting said lever and valve, substantially as set forth.

12. In a mash-preparing apparatus, the combination, with a receiving-vessel, of a valve-box mounted thereon, slide-valves located therein, and automatic devices to operate them, substantially as set forth.

13. In a mash-preparing apparatus, the combination, with a heating and a mixing cylinder, of a system of cooling-pipes interposed between them consisting of a series of pipes located one within the other, cross-pipes connecting the outer pipes, and water-main pipes for admitting water into and discharging it from the outer and cross pipes, substantially as set forth.

14. In a mash-preparing apparatus, the combination, with a heating-chamber and a mixing-cylinder, of a system of cooling-pipes interposed between them consisting of a series of pipes located one within the other, cross-pipes connecting the outer pipes, water-conduits for admitting water into and discharging it from the outer pipes, and a valve located in said pipe system, and a reciprocating diaphragm located in the heating-cylinder, and adapted to operate the valve aforesaid, substantially as set forth.

15. In a mash-preparing apparatus, the combination, with a receiving-vessel and a water-reservoir, of inlet and egress ports located in the vessels, slide-valves to open and close said ports, and automatic devices to operate said valves.

16. In a mash-preparing apparatus, the combination, with a screw-shaft and an arm traveling thereon, of a slide-bar, depending arms secured thereto, a rock-bar, connection between it and the slide-bar, and a double system of levers actuated by the rock-bar to operate the valves of the receiving-vessels.

17. In a mash-preparing apparatus, the combination, with a screw-shaft and an arm traveling thereon, of a slide-bar, depending arms secured thereto, a belt-shifter and a rock-bar, connection between them and the slide-bar, and a double system of levers actuated by the rock-bar to operate the valves of the receiving-vessels, substantially as set forth.

18. In a mash-preparing apparatus, the combination, with a screw-shaft and an arm traveling thereon, of a slide-bar, depending arms secured thereto, a rock-bar, connection between it and the slide-bar, a link-lever having one end secured to the rock-bar, and valve-rods secured to the link-lever on opposite sides of its fulcrum and by it actuated to operate the valves in the receiving-vessels, substantially as set forth.

19. In a mash-preparing apparatus, the combination, with a screw-shaft and an arm traveling thereon, of a slide-bar, depending arms secured thereto, a rock-bar, connection between it and the slide-bar, and a system of levers actuated by it to operate the valves in the water-reservoir.

20. In a mash-preparing apparatus, the combination, with a vertical receiver, of a commingler, an agitator located therein, and pumps to force the contents of the commingler to the heating or mixing cylinder, as the case may be, substantially as set forth.

In testimony that I claim the foregoing I have hereunto set my hand this 8th day of December, 1880.

HENRY DAVIES.

Witnesses:
A. M. BODLEY,
ISAAC BAUGHMAN.